US012761161B2

(12) United States Patent
Wu et al.

(10) Patent No.: US 12,761,161 B2

(45) Date of Patent: Oct. 13, 2026

(54) DETECTION DEVICE AND DETECTION METHOD FOR COMPLEX PERMITTIVITY

(71) Applicant: Advanced ACEBIOTEK CO., LTD., Hsinchu County (TW)

(72) Inventors: Hsiao-Hua Wu, Hsinchu City (TW); Kai-Yuan Tang, Taichung City (TW); Yung-Chou Hsu, New Taipei City (TW); Jyh-Chern Chen, New Taipei City (TW); Shen-Fu Hsu, Taitung County (TW)

(73) Assignee: Advanced ACEBIOTEK CO., LTD., Hsinchu County (TW)

( * ) Notice: Subject to any disclaimer, the term of this patent is extended or adjusted under 35 U.S.C. 154(b) by 219 days.

(21) Appl. No.: 18/793,934

(22) Filed: Aug. 4, 2024

(65) Prior Publication Data

US 2025/0369900 A1 Dec. 4, 2025

(30) Foreign Application Priority Data

Jun. 4, 2024 (TW) ................................ 113120555

(51) Int. Cl.
*G01N 22/00* (2006.01)

(52) U.S. Cl.
CPC .................................... *G01N 22/00* (2013.01)

(58) Field of Classification Search
CPC ...................................................... G01N 22/00
USPC ......................................... 324/639, 629, 630
See application file for complete search history.

(56) References Cited

U.S. PATENT DOCUMENTS

| | | | | |
|---|---|---|---|---|
| 5,468,964 A * | 11/1995 | Gopalsami | G01N 22/00 | 250/336.1 |
| 6,552,803 B1 * | 4/2003 | Wang | G01B 17/025 | 356/502 |
| 7,271,574 B2 * | 9/2007 | Xiang | G01Q 60/22 | 324/755.02 |
| 7,339,670 B2 * | 3/2008 | Carrig | G01S 7/499 | 356/342 |
| 11,563,405 B2 * | 1/2023 | Larson | G01N 22/00 | |

(Continued)

FOREIGN PATENT DOCUMENTS

| | | |
|---|---|---|
| CN | 105093366 A | 11/2015 |
| CN | 114279999 A | 4/2022 |

(Continued)

*Primary Examiner* — Arleen M Vazquez
*Assistant Examiner* — Robert P Alejnikov, Jr.
(74) *Attorney, Agent, or Firm* — Winston Hsu

(57) ABSTRACT

A detection device includes an electromagnetic wave transmitter, configured to emit an electromagnetic wave signal; a beam splitter, positioned in an transmission path of the electromagnetic wave signal, configured to divide the electromagnetic wave signal into a first electromagnetic wave signal and a second electromagnetic wave signal; an adjustable delay line, placed in an transmission path of the first electromagnetic wave signal, configured to adjust a path of the first electromagnetic wave signal; a sample holder, positioned in an transmission path of the second electromagnetic wave signal, configured to hold a sample to be tested; and an electromagnetic wave receiver, configured to receive the first electromagnetic wave signal passing through the adjustable delay line and the second electromagnetic wave signal passing through the sample holder, to generating an interference signal.

13 Claims, 7 Drawing Sheets

(56) References Cited

U.S. PATENT DOCUMENTS

| | | | | |
|---|---|---|---|---|
| 2016/0209275 | A1 * | 7/2016 | Cheung | H01Q 1/526 |
| 2020/0091608 | A1 * | 3/2020 | Alpman | H01Q 9/0414 |
| 2021/0389321 | A1 * | 12/2021 | Kaushik | G01N 21/64 |
| 2021/0391903 | A1 * | 12/2021 | Jam | H01Q 13/10 |
| 2023/0417598 | A1 * | 12/2023 | Deneuville | G01J 4/04 |

FOREIGN PATENT DOCUMENTS

| | | | |
|---|---|---|---|
| CN | 117268547 | A | 12/2023 |
| EP | 4 214 801 | B1 | 4/2024 |
| WO | 2022/063794 | A1 | 3/2022 |

* cited by examiner

DETECTION DEVICE AND DETECTION METHOD FOR COMPLEX PERMITTIVITY

BACKGROUND OF THE INVENTION

1. Field of the Invention

The present invention relates to a detection device and detection method, and more particularly, to a detection device and detection method enabling non-contact detection of complex permittivity.

2. Description of the Prior Art

Complex refractive indices or complex relative permittivities are significant parameters in the design and manufacture of optical and electronic components and circuits. For example, when manufacturing optical lenses, the knowledge of the complex refractive indices is essential to determine their focal lengths and transmittance. Similarly, when designing microstrip transmission lines, the knowledge of the complex permittivity of the circuit board is indispensable for calculating circuit characteristic impedance and transmission loss of the circuits.

In microwave engineering, obtaining the complex refractive index of a material or the complex permittivity of a circuit board typically involves measuring the amplitude and phase of electromagnetic waves. For millimeter-wave or higher-frequency electromagnetic waves, the nonlinear characteristics of Schottky diodes can be exploited by driving them with microwave signals to extract harmonic frequencies. By tuning the microwave signal frequency, adjustable millimeter-wave electromagnetic waves can be generated. When combined with a Schottky diode detector, this setup forms a millimeter-wave spectrum analyzer. However, this spectrum analyzer lacks phase detection capability, preventing direct measurement of complex refractive indices or complex permittivities.

In such a situation, developing techniques to enhance the phase detection capabilities of spectrum analyzers becomes a goal in the industry.

SUMMARY OF THE INVENTION

Therefore, the present invention is to provide a detection device and a detection method to solve the above issues.

An embodiment of the present invention discloses a detection device. The a detection device comprises an electromagnetic wave transmitter, configured to emit an electromagnetic wave signal; a beam splitter, positioned in an transmission path of the electromagnetic wave signal, configured to divide the electromagnetic wave signal into a first electromagnetic wave signal and a second electromagnetic wave signal; an adjustable delay line, placed in an transmission path of the first electromagnetic wave signal, configured to adjust a path of the first electromagnetic wave signal; a sample holder, positioned in an transmission path of the second electromagnetic wave signal, configured to hold a sample to be tested; and an electromagnetic wave receiver, configured to receive the first electromagnetic wave signal passing through the adjustable delay line and the second electromagnetic wave signal passing through the sample holder, to generating an interference signal.

Another embodiment of the present invention discloses a detection method for detecting at least one characteristic of a sample to be tested. The sample to be tested is removably placed in a detection device, the detection device generates a first electromagnetic wave signal and a second electromagnetic wave signal, a path of the first electromagnetic wave signal is adjustable, and the second electromagnetic wave signal is capable of passing through the sample to be tested. The detection method comprises adjusting the path of the first electromagnetic wave signal to control the detection device to generate a first interference signal when the sample to be tested is not placed in the detection device; adjusting the path of the first electromagnetic wave signal to control the detection device to generate a second interference signal when the sample to be tested is placed in the detection device; and determining the at least one characteristic based on the first interference signal and the second interference signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms “include” and “comprise” are utilized in an open-ended fashion, and thus should be interpreted to mean “include, but not limited to . . . ”. Also, the term “couple” is intended to mean either an indirect or direct electrical connection. Accordingly, if one device is coupled to another device, that connection may be through a direct electrical connection, or through an indirect electrical connection via other devices and connections.

To measure the complex refractive index or complex permittivity, the embodiment of the present invention employs a quasi-optical millimeter-wave interferometer to measure the complex refractive index or complex permittivity of the millimeter wave band. The concept is to measure the ratio of electric field amplitudes and the phase difference when an electromagnetic wave passes through a sample and a sample-free medium to obtain the imaginary part (i.e., extinction coefficient) and the real part (i.e., refractive index) of the complex refractive index, and then calculate the complex permittivity.

Figure 1:
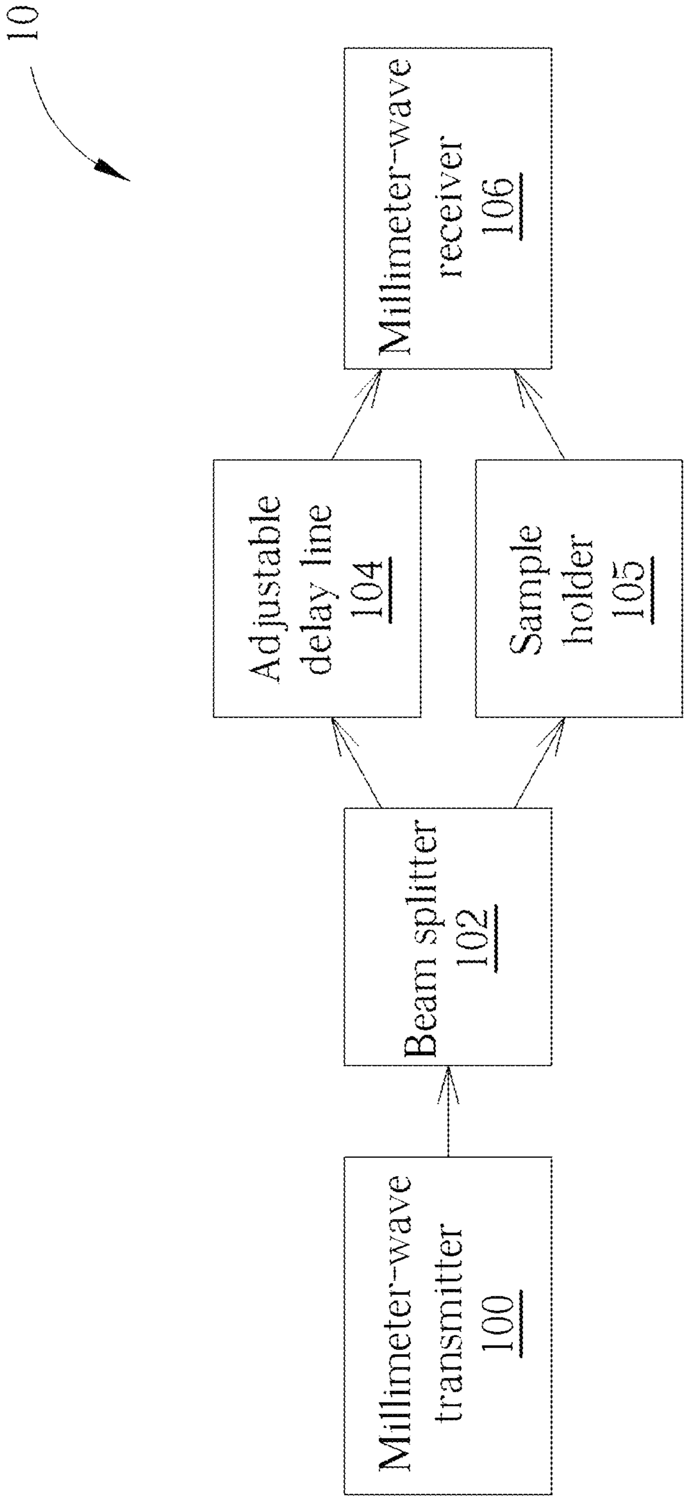
FIG. 1 is a schematic diagram of a detection device in accordance with an embodiment of the present invention.

Please refer to FIG. 1, which is a schematic diagram of a detection device 10 in accordance with an embodiment of the present invention. The detection device 10 is a quasi-optical millimeter-wave interferometer used to test the refractive index and the extinction coefficient of a sample DUT to be tested, from which the complex permittivity can be determined. The detection device 10 includes a millimeter-wave transmitter 100, a beam splitter 102, an adjustable delay line 104, a sample holder 105, and a millimeter-wave receiver 106. Additionally, the detection device 10 may be integrated internally or connected externally to a control and analysis system, such as a computer or computing host, to control the operation of each component and analyze the received signal from the millimeter-wave receiver 106, thereby obtaining the characteristics of the sample DUT (such as refractive index and extinction coefficient).

In detail, the millimeter-wave transmitter 100 serves as a millimeter-wave source implemented in any manner, and emits electromagnetic wave signals in the millimeter-wave band toward the beam splitter 102 via an antenna. The beam splitter 102 divides the electromagnetic wave signals transmitted by the millimeter-wave transmitter 100 into two beams: one (i.e., the first electromagnetic wave signal) passes through the adjustable delay line 104, and the other (i.e., the second electromagnetic wave signal) passes through the sample holder 105. These two beams intersect at the millimeter-wave receiver 106, creating interference. The sample holder 105 may accommodate the sample DUT. In one embodiment, the sample holder 105 may include a sensor to detect whether the sample DUT is present and may relay this information to the integrated or external control and analysis system. In one embodiment, the sample holder 105 may incorporate a rotation mechanism to adjust the incident angle of the second electromagnetic wave signal onto the sample DUT. Specifically, the adjustable delay line 104 may modify the optical path length to introduce a relative phase shift between the two beams (the first and second electromagnetic wave signals). Consequently, when the relative phase changes, a sinusoidal interference pattern forms at the millimeter-wave receiver 106. By analyzing the phase or optical path changes in the sinusoidal waveforms generated at the millimeter-wave receiver 106 with and without the sample DUT in place, the refractive index of the sample DUT can be determined. Furthermore, measuring the amplitude ratio of the electromagnetic waves passing through the sample DUT and without the sample DUT allows the extinction coefficient of the sample DUT to be calculated. Based on the refractive index and the extinction coefficient of the sample DUT, the complex permittivity can be computed by the control and analysis system. The underlying principles are explained as follows.

Figure 2A:
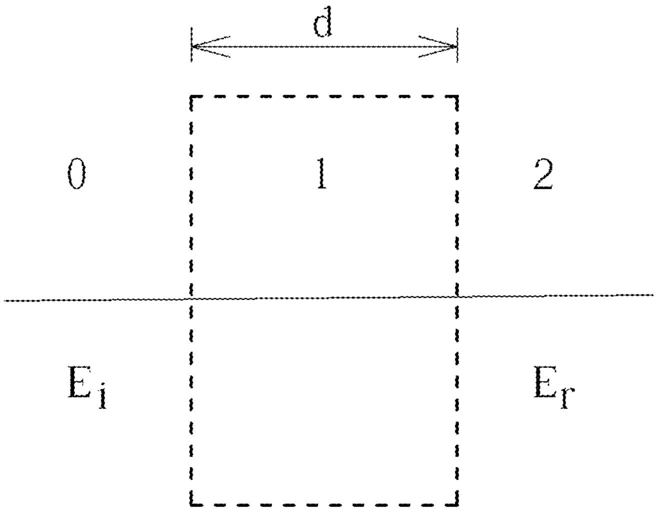
FIG. 2A is a schematic diagram illustrating an electromagnetic wave electric field when no sample is present.
Figure 2B:
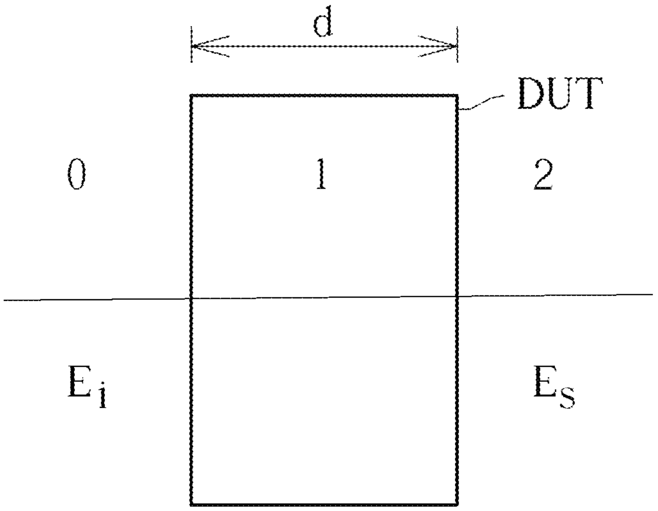
FIG. 2B is a schematic diagram illustrating an electromagnetic wave electric field when the sample is placed.

Please refer to FIG. 2A and FIG. 2B. FIG. 2A is a schematic diagram illustrating an electromagnetic wave electric field detected by the millimeter-wave receiver 106 in the detection device 10 when no sample DUT is present. In contrast, FIG. 2B is a schematic diagram illustrating an electromagnetic wave electric field detected by the millimeter-wave receiver 106 when the sample DUT is placed. In both FIG. 2A and FIG. 2B, a region 0 represents the area before the electromagnetic wave enters the sample DUT, a region 1 corresponds to the internal portion of the sample DUT, a region 2 represents the area after the electromagnetic wave exits the sample DUT, and d denotes the thickness of the sample DUT. The dashed line region in FIG. 2A indicates the intended position for placing the sample DUT, and the solid line region in FIG. 2B represents the actual placement of the sample DUT. Initially, when the sample holder 105 is empty (i.e. FIG. 2A), the refractive indices in the regions 0, 1, and 2 are all equal to 1 (i.e., $n_0=n_1=n_2=1$). The relationship between the incident and reflected electric fields is given by $E_r=e^{-ik_0n_0d}E_i$, where $E_i$ and $E_r$ correspond to the incident and reflected electric fields without the sample DUT. Upon inserting the sample DUT (FIG. 2B), we have:

$$n_0 = n_2 = 1;$$

$$n_1 = \tilde{n} = n + i\kappa = n + i\frac{\alpha}{2k_0};$$

where $$k_0 = \frac{2\pi}{\lambda_0} = \frac{\omega}{c}$$

is the wave propagation number in vacuum (meaning the number of waves per unit length along the direction of wave propagation), n is the refractive index, K is the extinction coefficient, α is the absorption coefficient, d is the sample thickness, $\lambda_0$ is the wavelength in vacuum, ω is the angular frequency, and c is speed of light.

Next, assume that $E_i$ represents the electric field of the incident electromagnetic wave on the sample DUT, and $E_s$ represents the electric field of the transmitted electromagnetic wave through the sample DUT, the relationship between $E_s$ and $E_i$ is given by:

$$E_s = FP_{012}t_{12}p_1t_{01}E_i,$$

$$FP_{012} = \sum_{m=0}^{M=\infty}(r_{10}p_1r_{12}p_1)^m = \frac{1}{1 + r_{10}r_{12}p_1^2},$$

$$p_1 = e^{ik_0n_1d},$$

$$t_{01} = \frac{2n_0}{n_0 + n_1} = \frac{2}{1 + n_1},$$

$$t_{12} = \frac{2n_1}{n_1 + n_2} = \frac{2n_1}{n_1 + 1},$$

$$r_{10} = \frac{n_1 - n_0}{n_1 + n_0} = \frac{n_1 - 1}{n_1 + 1},$$

$$r_{12} = \frac{n_1 - n_2}{n_1 + n_2} = \frac{n_1 - 1}{n_1 + 1},$$

where $t_{01}$ is the transmission coefficient for the electromagnetic wave entering the sample DUT, $p_1$ represents the change in electric field when the electromagnetic wave passes through the sample DUT, accounting for absorption effects and phase changes, $t_{12}$ is the transmission coefficient for the electromagnetic wave leaving the sample DUT, $FP_{012}$ represents the change in electric field due to multiple reflections of the electromagnetic wave propagating back and forth within the sample DUT, $r_{10}$ is the reflection coefficient at the boundary between the sample DUT and the incident medium, and $r_{12}$ is the reflection coefficient at the boundary between the sample DUT and the exit medium. Therefore, the ratio of electric fields when the electromagnetic wave passes through the sample DUT compared to when there is no sample DUT is given by:

$$\frac{E_s}{E_r} = \frac{4n_1}{(n_1+1)^2} e^{ik_0(n_1-1)d} \frac{1}{1+\left(\frac{n_1-1}{n_1+1}\right)^2 e^{i2k_0 n_1 d}}.$$

If the effects of multiple reflections are ignored, i.e., set M=0, then $FP_{012}=1$. In this case, the ratio of electric fields may be simplified to:

$$\frac{E_s}{E_r} = Ae^{i\Delta\phi} = \frac{4n_1}{(n_1+1)^2} e^{ik_0(n_1-1)d} = \frac{4n_1}{(n_1+1)^2} e^{-k_0\kappa d} e^{ik_0(n-1)d}.$$

Here, A represents the ratio of electric field amplitudes when passing through the sample DUT and without the sample DUT, and Δϕ is the phase difference of the electric field when passing through the sample DUT and without the sample DUT. From the above equation, the extinction coefficient κ and refractive index n can be obtained:

$$A = \left|\frac{E_s}{E_r}\right| = \frac{4n_1}{(n_1+1)^2} e^{-k_0\kappa d} \rightarrow \kappa = \frac{1}{k_0 d} \ln \frac{4n_1}{(n_1+1)^2} \left|\frac{E_r}{E_s}\right|,$$

$$e^{i\Delta\phi} = e^{ik_0(n-1)d} \rightarrow n = \frac{\Delta\phi}{k_0 d} + 1 = \frac{\Delta\phi}{2\pi}\frac{\lambda}{d} + 1.$$

If κ<<1, then:

$$\kappa = \frac{1}{k_0 d} \ln \frac{4n}{(n+1)^2} \left|\frac{E_r}{E_s}\right|.$$

The theoretical derivation above show that the extinction coefficient κ and refractive index n of the sample DUT can be determined by measuring the electric field amplitude ratio A and phase difference Δϕ when electromagnetic waves pass through the sample DUT and without the sample DUT. Note that, obtaining the extinction coefficient κ requires prior knowledge of the refractive index n.

Figure 3:
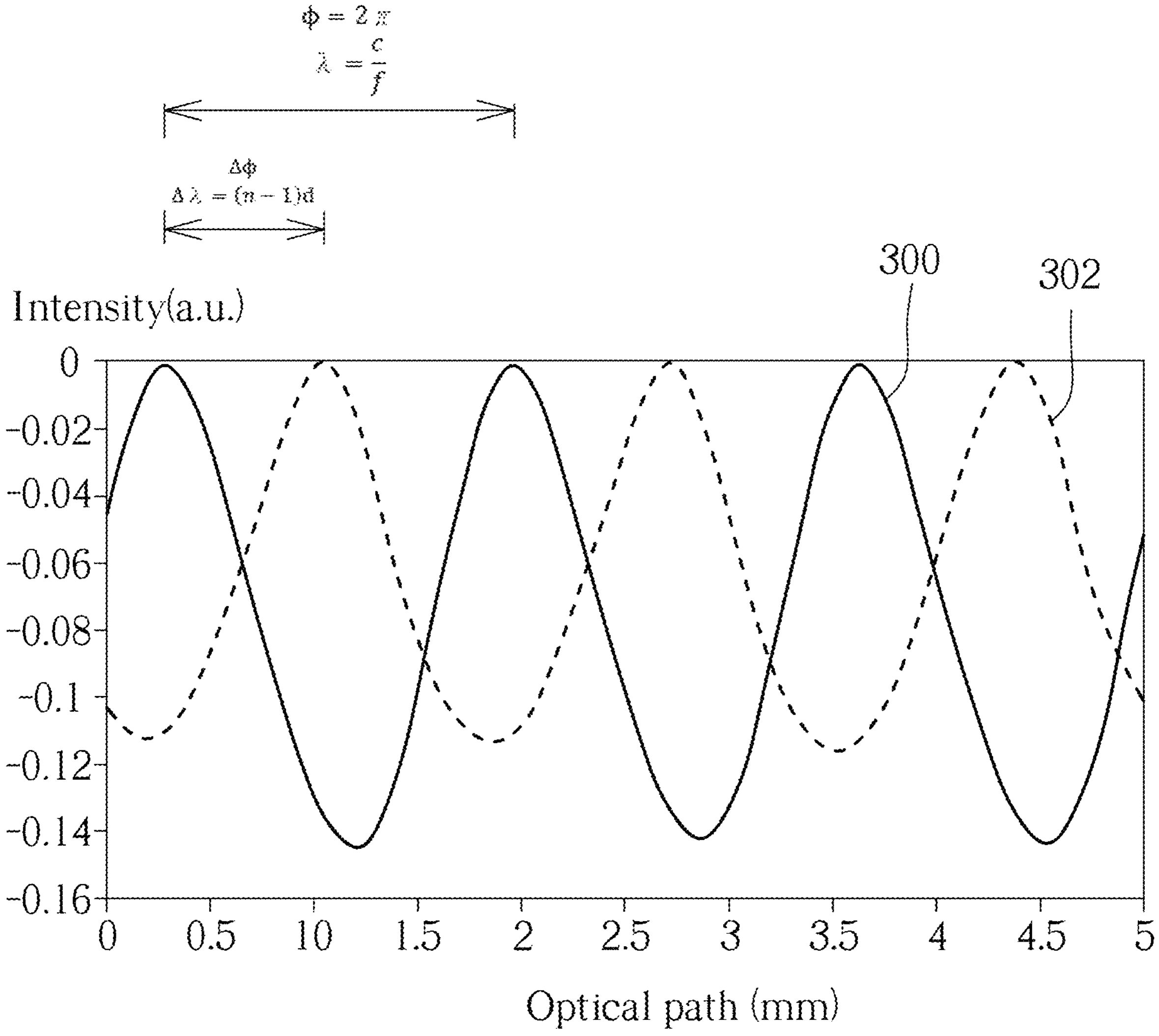
FIG. 3 is a schematic diagram of an interference waveform measured by the detection device shown in FIG. 1 according to an embodiment of the present invention.

Please continue to refer to FIG. 3, which is a schematic diagram of an interference waveform measured by the detection device 10 according to an embodiment of the present invention. In FIG. 3, a solid sine curve 300 represents the interference waveform generated at the millimeter-wave receiver 106 when no sample DUT is inserted, and a dashed sine curve 302 represents the interference waveform generated at the millimeter-wave receiver 106 when a sample DUT is inserted. The curves 300 and 302 are produced by adjusting the relative phase between two beams (the first electromagnetic wave signal and the second electromagnetic wave signal) using the adjustable delay line 104. This adjustment changes the optical path difference between the split electromagnetic waves before they converge at the millimeter-wave receiver 106, resulting in the corresponding interference waveforms. Additionally, the wavelength λ of the emitted electromagnetic wave signal can be determined from the frequency f, i.e., $$\lambda = \frac{c}{f}.$$

Furthermore, a phase difference ϕ corresponding to one wavelength λ is 2π, i.e., ϕ=2π.

After the phase difference Δϕ caused by inserting the sample DUT is measured, the abovementioned derivation process is applied to calculate the refractive index n. Another approach involves measuring the optical path difference Δλ introduced by inserting the sample DUT, to determine the refractive index n using the formula $$n = \left(\frac{\Delta\lambda}{d}\right) + 1.$$

The relationship between the complex permittivity $\tilde{\varepsilon}_r$ and the complex refractive index ñ is given by $$\tilde{n} = \sqrt{\tilde{\varepsilon}_r \tilde{\mu}_r}.$$

For non-magnetic materials, set $\tilde{\mu}_r=1$, then $$\tilde{n} = n + i\kappa = \sqrt{\tilde{\varepsilon}_r} = \pm\sqrt{\varepsilon_r' + i\varepsilon_r''} \text{ or } (n+i\kappa)^2 = n^2 + i2n\kappa - \kappa^2 = (n^2-\kappa^2) + i2n\kappa = \varepsilon_r' + i\varepsilon_r'',$$

such that $$\varepsilon_r' = n^2 - \kappa^2, \varepsilon_r'' = 2n\kappa.$$

Therefore, by measuring the electric field amplitude ratio A and phase difference Δϕ when electromagnetic waves pass through the sample DUT and without the sample DUT, the imaginary part (extinction coefficient κ) and real part (refractive index n) of the complex refractive index ñ are obtained, allowing to calculate the complex permittivity.

Please note that the detection device 10 in FIG. 1 is an embodiment of the present invention. When implementing the detection device 10, those skilled in the art should make appropriate variations or adjustments based on the adopted components and environmental conditions, while adhering to the aforementioned principles. For example, refer to FIG. 4, which is a schematic diagram of a detection device 40 according to an embodiment of the present invention. The detection device 40 is used to realize the detection device 10 and measure the complex permittivity of a sample DUT, i.e., to measure the ratio of the electric field amplitude as well as the phase difference when electromagnetic waves pass through the sample DUT versus when there is no sample DUT, so as to obtain the real and imaginary parts of the complex refractive index, and accordingly calculate the complex permittivity. The detection device 40 includes a tunable millimeter-wave transmitter 400, a beam splitter 402, off-axis parabolic mirrors 404 and 406, flat reflectors 408-416, a millimeter-wave receiver 418, an electromechanical translation stage 420, and a sample holder 422. The millimeter-wave transmitter 400 is controlled to generate electromagnetic waves in the 60 GHZ to 90 GHz millimeter-wave frequency range and radiates them toward the off-axis parabolic mirror 404. In one embodiment, the millimeter-wave transmitter 400 consists of at least a signal generator, at least a frequency multiplier, and at least a horn antenna. For instance, the signal generator produces an electromagnetic wave signal with an adjustable frequency range between 10 GHz and 15 GHZ, which passes through double and triple frequency multipliers to the horn antenna to emit millimeter-wave signals in the 60 GHz to 90 GHz range. The off-axis parabolic mirror 404 collimates the diverging millimeter-wave electromagnetic waves into approximately parallel beam and directs it toward the beam splitter 402. The beam splitter 402 reflects a portion of the beam from the off-axis parabolic mirror 404 to the flat reflector 408 (forming the second electromagnetic wave signal), while the remaining beam passes through and reaches the flat reflector 412 (forming the first electromagnetic wave signal). The beam (or the second electromagnetic wave signal) reflected by the beam splitter 402 to the flat reflector 408 passes through the sample holder 422 and is further reflected by the flat reflector 410 before focusing on the off-axis parabolic mirror 406 and finally reaching the millimeter-wave receiver 418. Along this path, if the sample DUT is placed in the sample holder 422, the beam (or the second electromagnetic wave signal) reflected by the flat reflector 408 will pass through the sample DUT and be reflected by the flat reflector 410 to reach the off-axis parabolic mirror 406. On the other hand, the beam (or the first electromagnetic wave signal) that passes through the beam splitter 402 and reaches the flat reflector 412 is further reflected by the flat reflectors 414 and 416 before focusing on the off-axis parabolic mirror 406 and reaching the millimeter-wave receiver 418. The flat reflectors 412 and 414 are positioned on the electromechanical translation stage 420, allowing controlled movement along a direction D1. This enables the adjustment of the optical path length from the beam splitter 402 through the flat reflectors 412, 414 to the flat reflector 416 to achieve the adjustable delay line 104 depicted in FIG. 1.

In short, the signals received by the millimeter-wave receiver 418 can be considered to consist of two electromagnetic paths. The first path originates from the millimeter-wave transmitter 400 and passes through the off-axis parabolic mirror 404, the beam splitter 402, the flat reflectors 412, 414, 416, and the off-axis parabolic mirror 404 before reaching the millimeter-wave receiver 418. The second path also starts from the millimeter-wave transmitter 400 and travels through the off-axis parabolic mirror 404, the beam splitter 402, the flat reflector 408, the sample holder 422, the flat reflector 410, and yet the off-axis parabolic mirror 404 before reaching the same millimeter-wave receiver 418. Preferably, the millimeter-wave receiver 418 may consist of a horn antenna and a millimeter-wave detector, with a frequency detection range wider than that of the millimeter-wave transmitter 400, but not limited to this. The sample holder 422 is used to position the sample DUT and may include a sensor to detect whether the sample DUT is properly placed.

In addition, it should be noted that in the embodiment of the present invention, the beam splitter 402 is used to direct the beam reflected by the off-axis parabolic mirror 404 to the flat mirror 408 and the flat mirror 412, respectively. The implementation of the beam splitter 402 is not limited to a specific structure. For example, in one embodiment, the beam splitter 402 may be implemented using wavefront splitting, which reflects a portion of the beam using one reflective surface and allows the remaining beam that is not blocked by the reflective mirror to pass through, so as to avoid the multi-beam interference phenomenon caused by multiple reflections. Specifically, in traditional Michelson interferometers, the beam splitter is typically implemented using amplitude splitting, where one surface is divided into transmitted light and reflected light with a fixed ratio, while the other surface is coated with an anti-reflective coating to reduce reflection. However, when the surface cannot be fully coated with broadband anti-reflective coating, frequency-dependent multi-beam interference occurs, resulting in distorted interference signals that are difficult to measure and analyze. Therefore, in the embodiment of the present invention, the beam splitter 402 is implemented using wavefront splitting to avoid the multi-beam interference caused by multiple reflections. Additionally, in one embodiment, the beam splitter 402 may be mounted on another (manually adjusted or electronically controlled) shift or translation stage, allowing it to move along a direction D2 and continuously adjust the splitting ratio.

Figure 4:
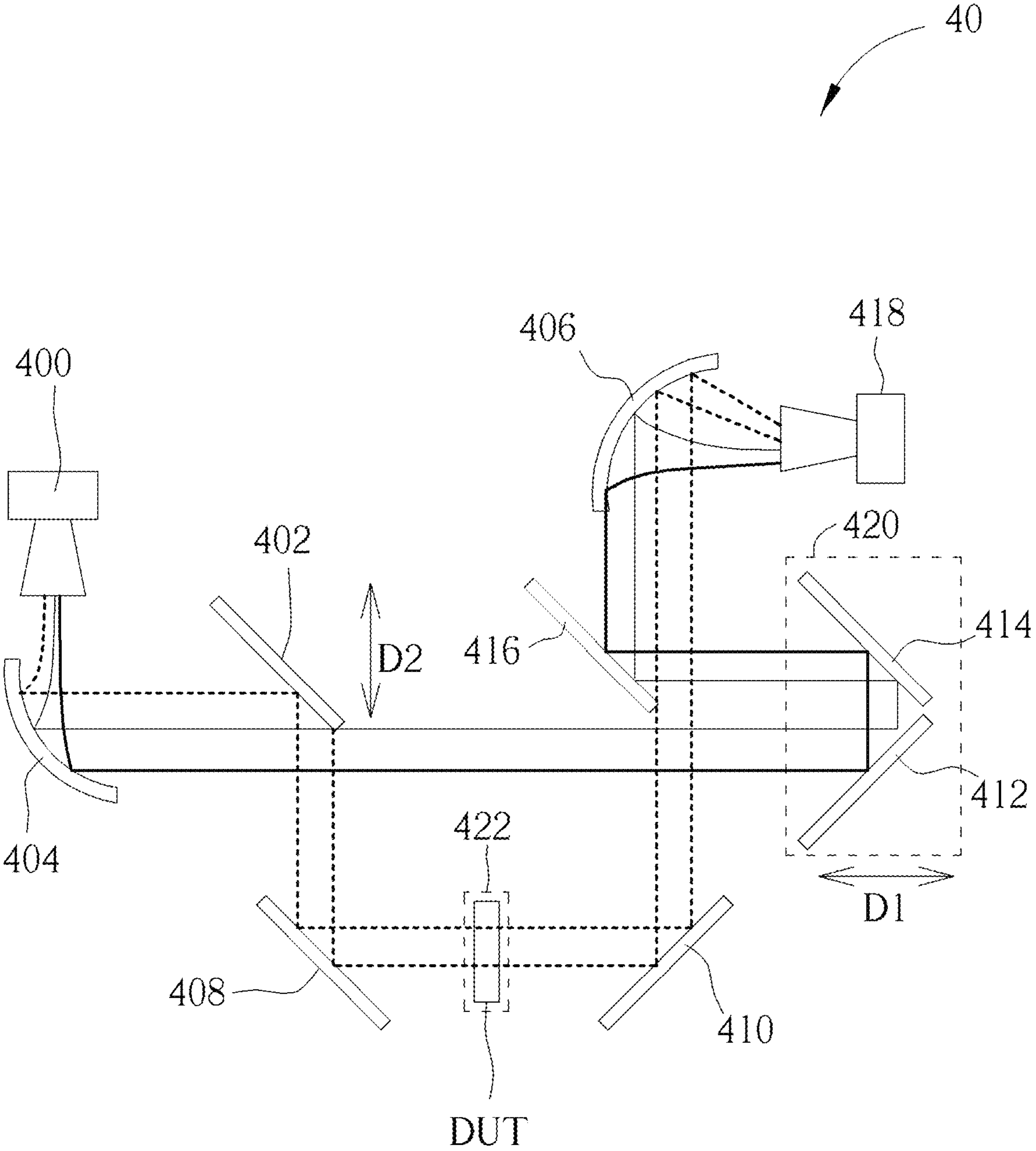
FIG. 4 is a schematic diagram of a detection device according to an embodiment of the present invention.
Figure 5:
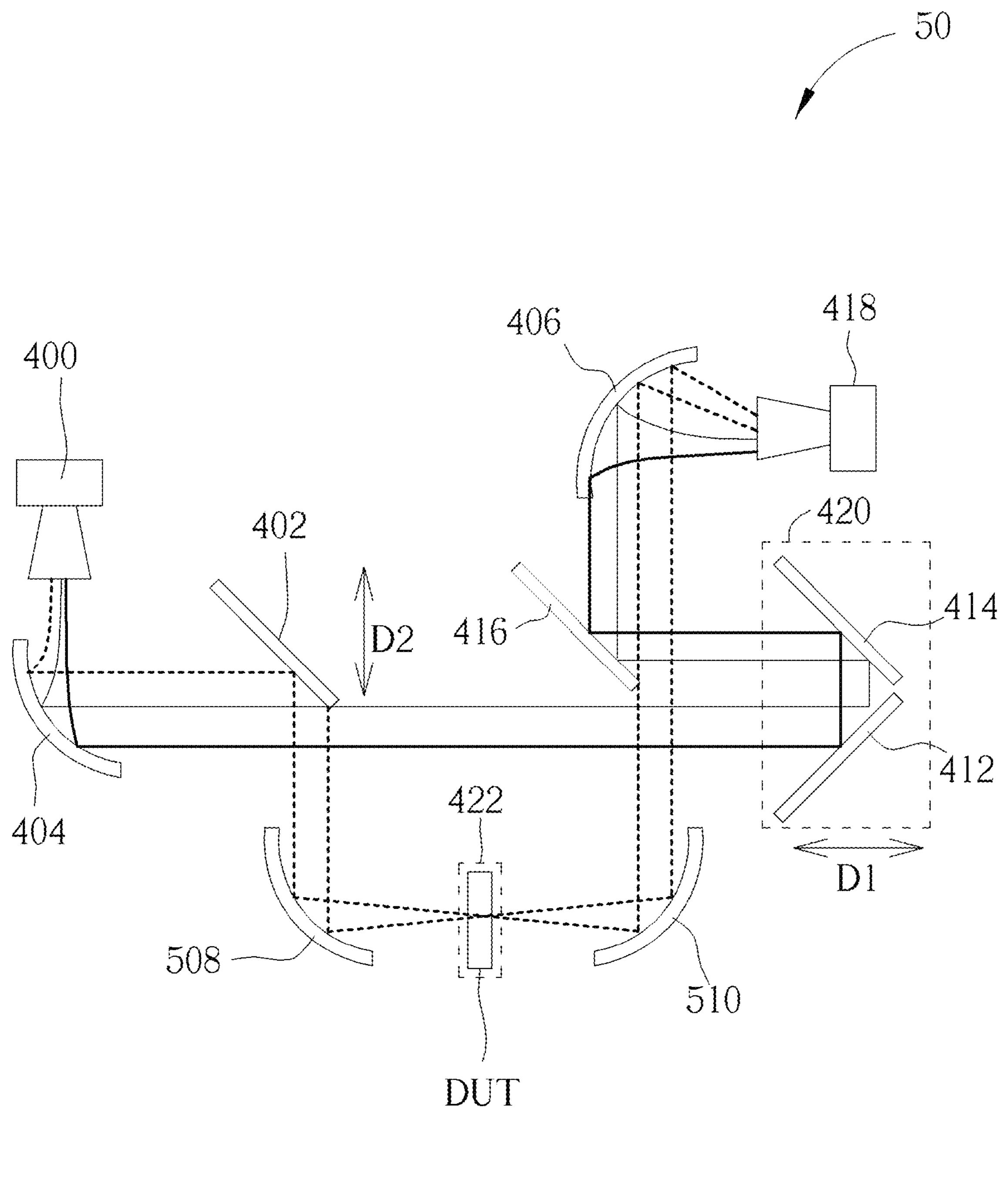
FIG. 5 is a schematic diagram of a detection device according to an embodiment of the present invention.

FIG. 4 schematically shows the components of the detection device 40, which is one feasible implementation of the detection device 10 but not limited to it. Those skilled in the art may accordingly make appropriate adjustments or modifications. For example, FIG. 5 illustrates a schematic diagram of a detection device 50 according to an embodiment of the present invention. The detection device 50 is derived from the detection device 40, so the same components are denoted by the same symbols. The difference between the detection device 50 and the detection device 40 lies in the use of off-axis parabolic mirrors 508 and 510 instead of the flat mirrors 408 and 410 in the detection device 40. The off-axis parabolic mirrors 508 and 510 form a confocal telescope system. Specifically, the off-axis parabolic mirror 508 reflects the collimated beam from the beam splitter 402, directing it to focus on the sample DUT. Then, the off-axis parabolic mirror 510 collimates the diverging beam passing through the sample DUT into approximately parallel beam, redirecting it to off-axis parabolic mirror 406, which finally focuses it onto the millimeter-wave receiver 418. The remaining operation of the detection device 50 is the same as that of the detection device 40, which can measure the ratio of the electric field amplitude and the phase difference of the electromagnetic wave passing through the sample DUT and without the sample DUT, to determine the real and imaginary parts of the complex refractive index and subsequently calculate the complex permittivity.

Figure 6:
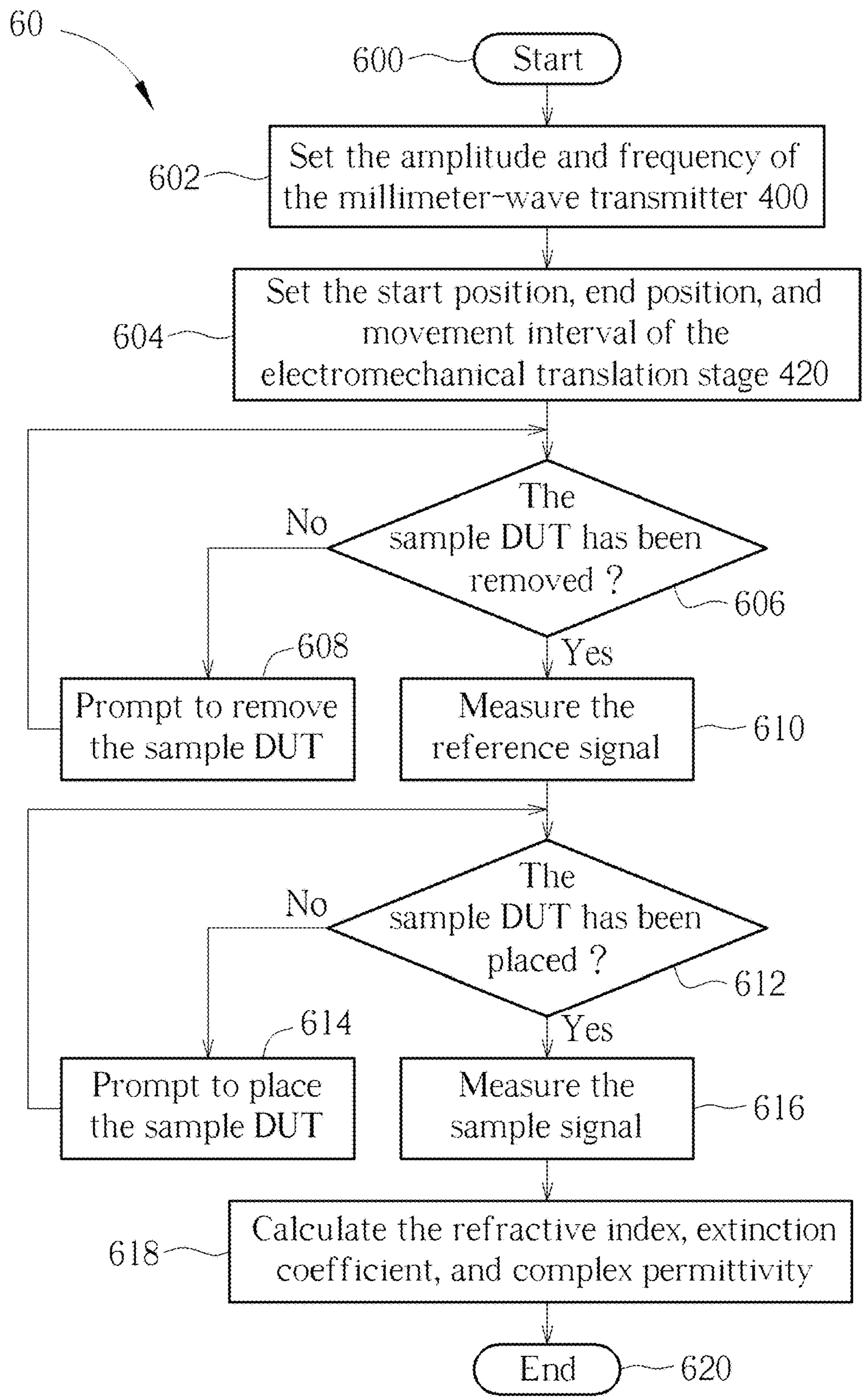
FIG. 6 is a schematic diagram of a process according to an embodiment of the present invention.

As can be known by comparing the detection device 40 and the detection device 50, the detection device 40 is suitable for testing a larger range of the sample DUT, while the detection device 50 is designed for more focused testing within a smaller range. Those skilled in the art may choose an appropriate design based on practical requirements, and the options are not limited to these specific examples Furthermore, the detection devices 40 and 50 may be equipped with an internal or external control and analysis system, such as computer systems or computational hosts, to control the emission frequency, frequency spacing, and amplitude of the millimeter-wave transmitter 400, or to manage the electromechanical translation stage 420 to adjust the movement range and spacing of the flat reflectors 412 and 414, and to analyze the signals received by the millimeter-wave receiver 418 to calculate parameters such as the refractive index, extinction coefficient, and complex permittivity of the sample DUT. The calculation method may be referred to the theoretical derivation process mentioned in the above. The control methods for the detection devices 40 and 50 can be summarized in a process flow, as shown in FIG. 6. The process 60 may be executed by the control and analysis system of the detection devices 40 and 50, and includes the following steps:

Step 600: Start.

Step 602: Set the amplitude and frequency of the millimeter-wave transmitter 400.

Step 604: Set the start position, end position, and movement interval of the electromechanical translation stage 420.

Step 606: Determine if the sample DUT has been removed from the sample holder 422. If yes, proceed to Step 610; if no, go to Step 608.

Step 608: Prompt to remove the sample DUT.

Step 610: Measure the reference signal.

Step 612: Determine if the sample DUT has been placed in the sample holder 422. If yes, proceed to Step 616; if no, go to Step 614.

Step 614: Prompt to place the sample DUT.

Step 616: Measure the sample signal.

Step 618: Calculate the refractive index, extinction coefficient, and complex permittivity.

Step 620: End.

According to the process 60, after starting the test, the control and analysis system should configure the amplitude and frequency of the millimeter-wave transmitter 400 (Step 602), including parameters such as the start frequency, stop frequency, and frequency spacing. The start and stop frequencies can be selected from any frequency between 60 GHz and 90 GHZ, with the stop frequency being greater than the start frequency. The frequency spacing is preferably a value divisible by 6 and less than 30 GHz, although other values are also acceptable. Next, the control and analysis system may set the start position, end position, and movement interval of the electromechanical translation stage 420 (Step 604). In one embodiment, the total movement distance of the electromechanical translation stage 420 may be set by the control and analysis system to 260,000 steps (with each step covering 0.125 micrometers), equivalent to 3.25 centimeters. However, this value can vary as long as it ensures obtaining interference waveforms spanning more than two wavelengths. Therefore, consideration should be given to the round-trip distance traveled by the electromagnetic waves, and the step count should correspond to a distance greater than the wavelength associated with the lowest frequency (e.g., 60 GHZ). Once the millimeter-wave transmitter 400 and the electromechanical translation stage 420 are configured, the measurement may begin. The process 60 first measures the amplitude. During this step, the path of the delay line (i.e., the path of the first electromagnetic wave signal) is blocked to avoid interference, and the sample DUT is removed. Therefore, Step 606 checks whether the sample DUT has been removed from the sample holder 422, e.g., by the sensor set on the sample holder 422 to detect existence of the same DUT. If not (Step 608), the operator is prompted to remove the sample DUT. If the sample DUT has been removed (Step 610), the channel for the delay line (i.e., the path of the first electromagnetic wave signal) is opened to generate interference, and the measurement focuses on the reference signal. After measuring all the configured frequencies, the sample DUT is placed into the sample holder 422 to start measuring the sample signal. Therefore, Step 612 checks whether the sample DUT has been placed in the sample holder 422, e.g., by the sensor set on the sample holder 422 to detect existence of the same DUT. If not (Step 614), the operator is prompted to insert the sample DUT. If the sample DUT is already in place (Step 616), the channel is opened to generate interference and measure the sample signal. After all the configured frequencies are measured, calculations can be performed (Step 618). The thickness d of the sample DUT must be input before the calculations. As previously derived, the extinction coefficient calculation involves the refractive index, such that the refractive index must be calculated first, followed by the extinction coefficient. Once the refractive index and extinction coefficient are known, the complex permittivity can be determined. For detailed theory and computation methods, please refer to the aforementioned derivation process.

Therefore, the above process 60 can be further summarized as follows: when the sample to be tested is not placed in the detection device, adjusting the path of the first electromagnetic wave signal to control the detection device to generate a first interference signal; when the sample to be tested is placed in the detection device, adjusting the path of the first electromagnetic wave signal to control the detection device to generate a second interference signal, and based on the first and second interference signals, determining at least one characteristic of the sample to be tested.

Figure 7:
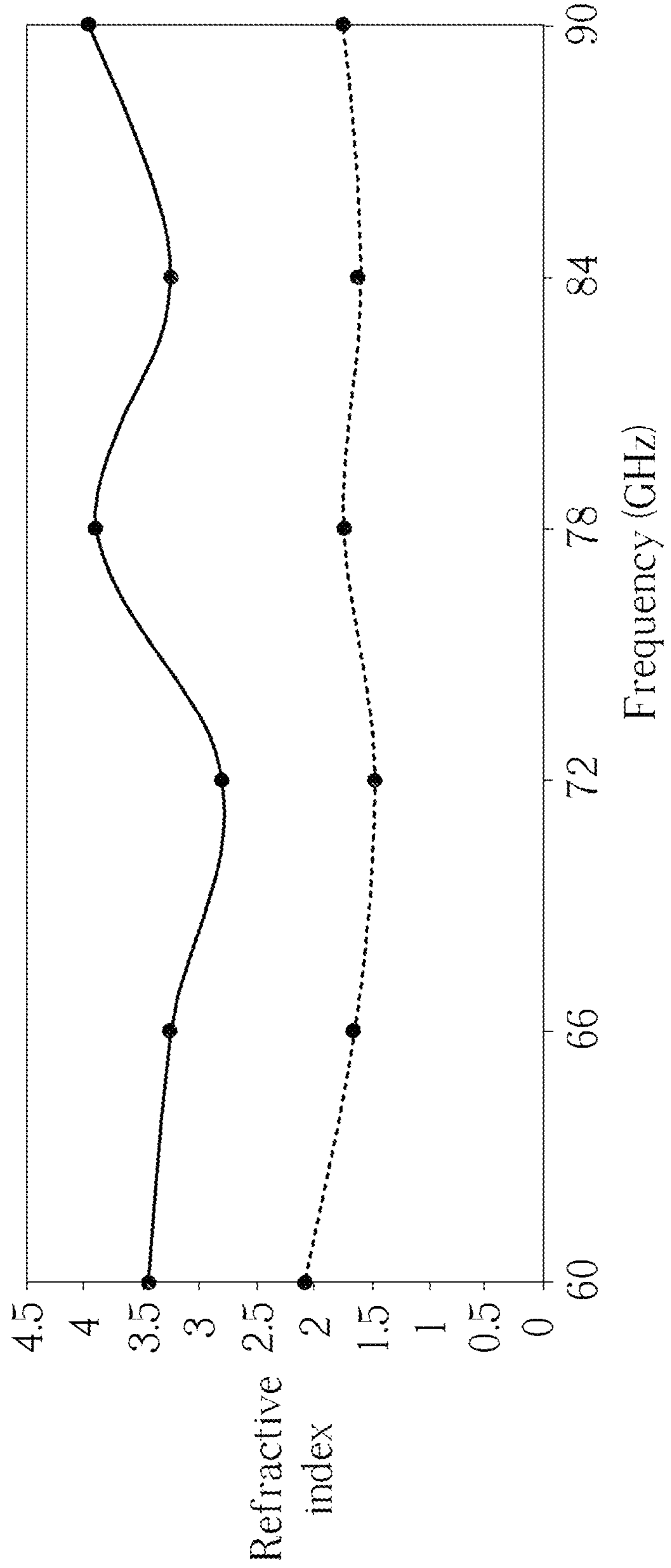
FIG. 7 is a schematic diagram illustrating the variation of refractive indices with frequencies for a gallium arsenide wafer and a polypropylene board measured at a 0-degree angle of incidence.

Additionally, in the refractive index calculation formula, the effect of multiple reflections within the sample DUT is neglected. Therefore, the measured and calculated values actually fluctuate with different frequencies, and the range of fluctuations increases with an increase in refractive index. For example, FIG. 7 illustrates the variation of refractive indices with frequencies for a gallium arsenide wafer and a polypropylene board measured at a 0-degree angle of incidence. The solid line represents the refractive index curve for the gallium arsenide wafer, while the dashed line represents the refractive index curve for the polypropylene board. From FIG. 7, it can be observed that the refractive index of the polypropylene board is smaller than that of the gallium arsenide wafer, and the fluctuations in refractive index with different frequencies are also smaller.

One method to reduce or eliminate this multiple reflection effect is to change the angle of electromagnetic wave incidence on the sample DUT from 0 degrees (normal incidence) to the Brewster angle, while ensuring that the electromagnetic wave is in the transverse magnetic polarization state. As known in the field, the Brewster angle is the angle of linear polarization at which the reflected light is perpendicular to the refracted light when incident at this angle. Therefore, when the angle of electromagnetic wave incidence on the sample DUT is changed from 0 degrees to the Brewster angle, the reflected and refracted lights are mutually perpendicular, and the electromagnetic wave is in the transverse magnetic polarization state, reducing the multiple reflection effect. In such a situation, the sample holder 105 or 422 may include a rotation mechanism to adjust the angle of incidence of the electromagnetic wave (the second electromagnetic wave signal) on the sample DUT to match the Brewster angle for the sample DUT. Furthermore, a pre-polarizer can be placed between the sample holder 105 or 422 and the beam splitter 102 or 402 to reduce the multiple reflection effect of the second electromagnetic wave signal incident on the sample DUT.

It should be noted that, the detection devices 10, 40, and 50 are embodiments of the present invention, and those skilled in the art may make appropriate modifications. For instance, the millimeter-wave transmitters 100 and 400 may be implemented in any suitable manner as millimeter-wave sources, while the millimeter-wave receivers 106 and 418 are corresponding detectors in the relevant frequency range. Alternatively, the millimeter-wave receivers 106 and 418 may be zero-bias detectors that do not require an external power supply, with a frequency detection range optimally larger than the emission frequency range of the electromagnetic wave transmitters 100 and 400. However, other combinations of transmitters and detectors may also be used to realize the millimeter-wave transmitters 100 and 400 and the millimeter-wave receivers 106 and 418. For example, collision avalanche transit-time diode oscillators or backward-wave oscillators may be used as transmitters for implementing the millimeter-wave transmitters 100 and 400, while pyroelectric detectors or thermal radiation detectors may be used as detectors for implementing the millimeter-wave receivers 106 and 418. This would allow the operating frequency range to extend downward into the microwave band or upward into the terahertz band.

Additionally, FIG. 4 and FIG. 5 illustrate the optical effects of the off-axis parabolic mirrors 404 and 406, the flat reflectors 408-416, and the off-axis parabolic mirrors 508 and 510. These optical components are well-known in the field, and designers should select appropriate elements and material characteristics based on system requirements.

In the prior art, spectrum analyzers lack phase detection capabilities, making it impossible to measure the complex refractive index or complex permittivity. In contrast, the present invention measures the ratio of electric field amplitudes and phase differences when electromagnetic waves pass through a sample to be tested and a sample-free environment. This allows determination of the real and imaginary parts of the complex refractive index, which in turn provides the complex permittivity. Consequently, the present invention enables non-contact detection of complex permittivity and can be further applied in the design and manufacture of optical and electronic components and circuits for optimization purposes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection device comprising:

an electromagnetic wave transmitter, configured to emit an electromagnetic wave signal;

a beam splitter, positioned in an transmission path of the electromagnetic wave signal, configured to divide the electromagnetic wave signal into a first electromagnetic wave signal and a second electromagnetic wave signal;

an adjustable delay line, placed in an transmission path of the first electromagnetic wave signal, configured to adjust a path of the first electromagnetic wave signal;

a sample holder, positioned in an transmission path of the second electromagnetic wave signal, configured to hold a sample to be tested; and an electromagnetic wave receiver configured to receive the first electromagnetic wave signal passing through the adjustable delay line and the second electromagnetic wave signal passing through the sample holder to generate an interference signal.

2. The detection device of claim 1, further comprising an off-axis parabolic mirror, configured to convert the electromagnetic wave signal emitted by the electromagnetic wave transmitter into a collimated parallel beam and direct the collimated parallel beam toward the beam splitter.

3. The detection device of claim 1, wherein the beam splitter employs wavefront splitting to separate the electromagnetic wave signal into the first and second electromagnetic wave signals.

4. The detection device of claim 3, wherein the beam splitter is mounted on a translation stage, wherein the translation stage is configured to adjust a position of the beam splitter relative to the electromagnetic wave transmitter, to control a beam ratio of the first electromagnetic wave signal and the second electromagnetic wave signal.

5. The detection device of claim 1, wherein the adjustable delay line comprises:

a plurality of flat mirrors, configured to guide the first electromagnetic wave signal to the electromagnetic wave receiver;

an electromechanical translation stage, configured to setting up at least one of the plurality of flat mirrors, wherein the electromechanical translation stage is controlled to move to alter a path length of the first electromagnetic wave signal directed by the plurality of flat mirrors to the electromagnetic wave receiver.

6. The detection device of claim 1, further comprising an off-axis parabolic mirror, configured to focus the first electromagnetic wave signal that has passed through the adjustable delay line and the second electromagnetic wave signal that has passed through the sample holder onto the electromagnetic wave receiver.

7. The detection device of claim 1, further comprising a pair of flat mirrors or a pair of off-axis parabolic mirrors, positioned on both sides of the sample holder, configured to direct the second electromagnetic wave signal sent by the beam splitter to the sample holder and then to the electromagnetic wave receiver after passing through the sample holder.

8. The detection device of claim 1, wherein the sample holder is equipped with a rotating mechanism to adjust an angle of incidence at which the second electromagnetic wave signal is incident on the sample to be tested.

9. The detection device of claim 8, wherein the rotating mechanism adjusts the angle of incidence to correspond to a Brewster angle for the sample to be tested.

10. The detection device of claim 8, further comprising a pre-polarizing plate, positioned between the sample holder and the beam splitter, configured to reduce multiple reflection effects of the second electromagnetic wave signal incident on the sample to be tested.

11. The detection device of claim 1, wherein the electromagnetic wave transmitter comprises a signal generator, at least one frequency multiplier, and a horn antenna.

12. The detection device of claim 1, wherein a frequency of the electromagnetic wave signal is within a millimeter wave range.

13. The detection device of claim 1, wherein a frequency detection range of the electromagnetic wave receiver is greater than an emission frequency range of the electromagnetic wave transmitter.

* * * * *